United States Patent
Cao et al.

(10) Patent No.: US 10,180,181 B2
(45) Date of Patent: Jan. 15, 2019

(54) CAM GEAR AND LINEAR DRIVE DEVICE COMPRISING SAID CAM GEAR

(71) Applicant: CONTINENTAL AUTOMOTIVE GMBH, Hannover (DE)

(72) Inventors: Xiangguang Cao, Wuhu (CN); Longsheng Zhao, Wuhu (CN); Xiaolin Du, Wuhu (CN); Jingjing Song, Wuhu (CN); Wenjuan Ye, Wuhu (CN)

(73) Assignee: Continental Automotive GmbH, Hannover (DE)

( * ) Notice: Subject to any disclaimer, the term of this patent is extended or adjusted under 35 U.S.C. 154(b) by 219 days.

(21) Appl. No.: 14/916,356

(22) PCT Filed: Sep. 5, 2014

(86) PCT No.: PCT/EP2014/068970
§ 371 (c)(1),
(2) Date: Mar. 3, 2016

(87) PCT Pub. No.: WO2015/036332
PCT Pub. Date: Mar. 19, 2015

(65) Prior Publication Data
US 2016/0215863 A1    Jul. 28, 2016

(30) Foreign Application Priority Data

Sep. 10, 2013   (CN) .................... 2013 2 0560237 U (51) Int. Cl.
*F16H 25/18*   (2006.01)
*F16H 61/32*   (2006.01)
(Continued)

(52) U.S. Cl.
CPC ............. *F16H 25/18* (2013.01); *F02M 26/54* (2016.02); *F02M 26/67* (2016.02);
(Continued)

(58) Field of Classification Search
CPC .............. F16K 31/528; F16K 31/5282; F16K 31/5286; F16K 31/5284; F16H 25/14;
(Continued)

(56) References Cited

U.S. PATENT DOCUMENTS 2,115,212 A * 4/1938 Padgett ............... F16H 61/0274
475/208
2,728,428 A * 12/1955 Cohen ..................... D06F 37/30
188/134

(Continued)

FOREIGN PATENT DOCUMENTS

CN       201747485 U      2/2011
CN       202561210 U     11/2012
(Continued)

OTHER PUBLICATIONS

Office Action dated Mar. 27, 2017 which issued in the corresponding Japanese Patent Application No. 2016-541894.

*Primary Examiner* — William Kelleher
*Assistant Examiner* — Gregory T Prather
(74) *Attorney, Agent, or Firm* — Cozen O'Connor (57) ABSTRACT

A cam gear for a linear drive device that transforms a rotational movement of a first component into a linear movement of a second component includes a cam trench, having, in a circumferential direction of the cam gear, a first end portion and a second end portion, the cam trench being arranged on an end face of the cam gear. The cam gear is configured as a sector gear, and at least one of the first and second end portions of the cam trench is open.

12 Claims, 9 Drawing Sheets

(51) Int. Cl.
*F16K 31/528* (2006.01)
*F16K 31/53* (2006.01)
*F16H 37/12* (2006.01)
*F16K 31/04* (2006.01)
*F02M 26/54* (2016.01)
*F02M 26/67* (2016.01)
*F16K 31/524* (2006.01)
*F02M 26/48* (2016.01)

(52) U.S. Cl.
CPC ........... *F16H 37/124* (2013.01); *F16H 61/32* (2013.01); *F16K 31/04* (2013.01); *F16K 31/528* (2013.01); *F16K 31/52408* (2013.01); *F16K 31/53* (2013.01); *F02M 26/48* (2016.02)

(58) Field of Classification Search
CPC .. F16H 53/00; F16H 21/44; F16H 2061/2869; F16H 61/32
See application file for complete search history.

(56) References Cited

U.S. PATENT DOCUMENTS

| | | | | |
|---|---|---|---|---|
| 2,874,584 A * | 2/1959 | Ahlport | ................... | F16H 3/40 74/319 |
| 3,055,180 A * | 9/1962 | Kane | ................... | F16H 61/40 60/368 |
| 3,459,056 A * | 8/1969 | Lea | ................... | F16H 35/00 74/29 |
| 3,752,957 A * | 8/1973 | Oldenburg | ................... | G06C 7/00 235/145 R |
| 4,000,581 A * | 1/1977 | Fukumoto | ................... | E05F 11/382 49/103 |
| 4,079,636 A * | 3/1978 | Altenschulte | ................... | F16H 53/00 200/19.15 |
| 4,185,509 A * | 1/1980 | McLarty | ................... | F16H 15/50 475/185 |
| 4,286,473 A * | 9/1981 | Dehan | ................... | F16H 53/00 74/107 |
| 4,510,590 A * | 4/1985 | Girton | ................... | G11B 3/001 369/63 |
| 4,553,659 A * | 11/1985 | Reim | ................... | B65B 35/205 198/370.07 |
| 4,562,753 A * | 1/1986 | Kingsbury | ................... | B65G 25/00 74/568 R |
| 4,696,590 A | 9/1987 | Bierhoff et al. | | |
| 4,869,126 A * | 9/1989 | Russ | ................... | F16H 27/10 192/148 |
| 4,887,490 A * | 12/1989 | Russ | ................... | B64C 1/1407 244/137.1 |
| 5,048,853 A * | 9/1991 | Trefz | ................... | B62D 7/142 180/411 |
| 5,381,283 A * | 1/1995 | Lee | ................... | G11B 15/6653 360/85 |
| 5,788,330 A * | 8/1998 | Ryan | ................... | B60N 2/2354 297/367 R |
| 5,903,114 A * | 5/1999 | Miller | ................... | B60S 1/16 15/250.22 |
| 5,924,324 A * | 7/1999 | Kilker | ................... | F16H 19/08 15/250.3 |
| 6,062,826 A * | 5/2000 | Morimoto | ................... | F16K 31/52408 137/624.13 |
| 8,181,545 B2 * | 5/2012 | Keefover | ................... | F16K 31/047 185/39 |
| 9,896,177 B1 * | 2/2018 | Tuchscherer | ................... | B63H 21/14 |
| 2002/0158475 A1 * | 10/2002 | Rice | ................... | E05B 81/14 292/216 |
| 2004/0139815 A1 * | 7/2004 | Shimamura | ................... | F16H 59/10 74/335 |
| 2004/0261559 A1 * | 12/2004 | Ozaki | ................... | F16H 61/32 74/473.12 |
| 2006/0128535 A1 * | 6/2006 | Smith | ................... | A63B 21/155 482/94 |
| 2008/0029073 A1 * | 2/2008 | Klipfel | ................... | F16K 31/5282 123/568.11 |
| 2008/0078265 A1 * | 4/2008 | Shiozaki | ................... | F16H 63/18 74/473.12 |
| 2008/0127766 A1 * | 6/2008 | Ogasawara | ................... | B60K 17/08 74/473.16 |
| 2008/0188976 A1 * | 8/2008 | Korajda | ................... | G05B 19/416 700/186 |
| 2010/0021274 A1 * | 1/2010 | Takahashi | ................... | B21D 43/05 414/222.02 |
| 2010/0287838 A1 * | 11/2010 | Kitayama | ................... | E05F 5/003 49/156 |
| 2011/0258860 A1 * | 10/2011 | Chervenak | ................... | B26B 17/02 30/266 |
| 2013/0161149 A1 * | 6/2013 | Hazama | ................... | B60T 1/005 192/220.2 |
| 2017/0167548 A1 * | 6/2017 | Schlatzer | ................... | F16D 23/12 |
| 2017/0268671 A1 * | 9/2017 | Fujimoto | ................... | B62M 11/06 |
| 2017/0334314 A1 * | 11/2017 | Takada | ................... | B60N 2/0232 |

FOREIGN PATENT DOCUMENTS

| | | |
|---|---|---|
| DE | 10 2006 031 028 A1 | 1/2008 |
| DE | 10 2012 106 281 A1 | 1/2013 |
| JP | S 61-277478 | 12/1986 |
| WO | WO 2013/167704 | 11/2013 |

\* cited by examiner

CAM GEAR AND LINEAR DRIVE DEVICE COMPRISING SAID CAM GEAR

CROSS-REFERENCE TO RELATED APPLICATIONS

This is a U.S. national stage of application No. PCT/EP2014/068970, filed on 5 Sep. 2014, which claims priority to the Chinese Application No. 2013 205 60237.6 filed 10 Sep. 2013, the content of both incorporated herein by reference.

BACKGROUND OF THE INVENTION

1. Field of the Invention

The present invention relates to a linear drive device for transforming a rotational movement into a linear movement, and particularly relates to a cam gear (i.e., a gear with a cam trench) for use in the linear drive device.

2. Related Art

In industries such as the automotive industry, a precisely controllable valve device is generally required, for example, for use in a control valve of an engine exhaust gas recirculation system (referred to as an EGR control valve hereinafter). Since most such valve devices use a motor as a drive source, there is a need for a linear drive device that transforms a rotational output of the motor into a linear movement of a valve stem.

In order to replace a two-stage or multi-stage transmission with a one-stage transmission so as to reduce the overall size and manufacturing cost of the device, it is known that this linear drive device can use a cam gear, a cam trench being formed on an end face of the cam gear. The rotational movement of the motor is transmitted to teeth of the cam gear and causes the rotation of the cam gear.

During the rotation of the cam gear, a follower fixedly connected to the valve stem linearly moves back and forth in the cam trench in an axial direction of the valve stem, so as to drive the valve stem to move up and down.

In the prior art cam gears, the cam trench is closed at both ends, so that the follower can only be assembled in the cam trench in a direction perpendicular to the plane of the gear, and thus the assembling is not easy to carry out. Moreover, the existing cam curve of the cam trench fails to effectively reduce the rigid impact. In addition, a shaft bore provided on the cam gear and intended for cooperating with an axle of a restoring system is a round bore, and therefore the cooperation between the shaft bore and the axle is easy to loosen. Furthermore, when a plastic gear is used for a light weight, the strength of the gear teeth is insufficient, and the teeth easily break off.

SUMMARY OF THE INVENTION

An object of the present invention is to solve one or more of the above-mentioned problems in the prior art.

According to a first aspect of the present invention, a cam gear is provided for use in a linear drive device for transforming a rotational movement of a first component into a linear movement of a second component, a cam trench being provided on an end face of the cam gear, wherein the cam gear is constructed as a sector gear, and at least one of the two end portions of the cam trench in a circumferential direction of the gear is open.

According to one aspect, a cam curve of the cam trench is a fifth-order polynomial curve that is relatively flat at the starting point and the end point.

According to another aspect, the cam trench extends through an angle within the range of 180 degrees to 320 degrees, in the circumferential direction of the gear.

According to another aspect, the cam trench comprises an introduction segment, a movement segment and a meshing segment, wherein the introduction segment is used to introduce a follower fixedly connected to the second component, the movement segment is used for causing a linear stroke of the follower, and the meshing segment is used for preventing the cam gear from disengaging from the first component when the follower reaches the end point of the stroke. Preferably, an outwardly expanding horn mouth is provided at an opening of the introduction segment. At least part of a curve profile of the introduction segment can rise by a predetermined height. Further preferably, the movement segment extends through an angle within the range of 150 degrees to 300 degrees, in the circumferential direction of the gear.

According to another aspect, a shaft bore having a non-circular cross section is provided at the center of the cam gear. Preferably, a cross section of the shaft bore is "D"-shaped.

According to a preferred embodiment, the length by which a sectoral face of the cam gear extends in the circumferential direction of the gear is equal to the length by which the cam trench extends in the circumferential direction of the gear. Preferably, both end portions of the cam trench in the circumferential direction of the gear are open.

Another aspect of the present invention relates to a linear drive device, comprising: a motor; a speed-reducing transmission stage that comprises a pinion gear fixedly connected to an output shaft of the motor and a transmission gear meshing with the pinion gear; and a linear transmission stage that transforms a rotational movement of the transmission gear into a linear movement of a output connecting rod, the output connecting rod being received in a sleeve member so as to merely move linearly, wherein the transmission gear is a cam gear according to the first aspect of the present invention as described above.

According to an aspect of the present invention, the cam gear is constructed as a sector gear, and at least one of two end portions of the cam trench in a circumferential direction of the gear is open; therefore, light weight is realized without reducing strength, and the follower can be easily assembled in the cam trench.

In addition, rigid impact can be effectively reduced by the cam curve of the cam trench being configured as a fifth-order polynomial curve that is relatively flat at the starting point and the end point. Furthermore, torque can be effectively transmitted between the shaft bore and the mating shaft by the shaft bore of the cam gear being designed to have a non-circular cross section.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the figures.

DETAILED DESCRIPTION OF THE PRESENTLY PREFERRED EMBODIMENTS

An linear drive device and a cam gear for use in the linear drive device according to one embodiment of the present invention will be described below with reference to the drawings. In the following description, many specific details are set forth in order to enable a person skilled in the art to more completely understand the present invention. However, it would be apparent to a person skilled in the field that the present invention may be achieved without some of these specific details. Furthermore, it should be understood that the present invention is not limited to the particular embodiment described herein. Instead, it is envisaged herein that any combination of the following features and elements can be used to implement the present invention, regardless of whether or not they are represented in different figures. Therefore, the following aspects, features, and advantages are merely illustrative and should not be regarded as elements or definitions of the claims, unless explicitly stated in the claims.

Taking a linear drive device of an EGR control valve for use in the engine exhaust gas recirculation as an example, the linear drive device according to the present invention will be explained below, but the present invention is not limited thereto. The linear drive device according to the present invention can be used with any equipment requiring small precise linear control, such as a variety of valves and actuators.

Figure 1:
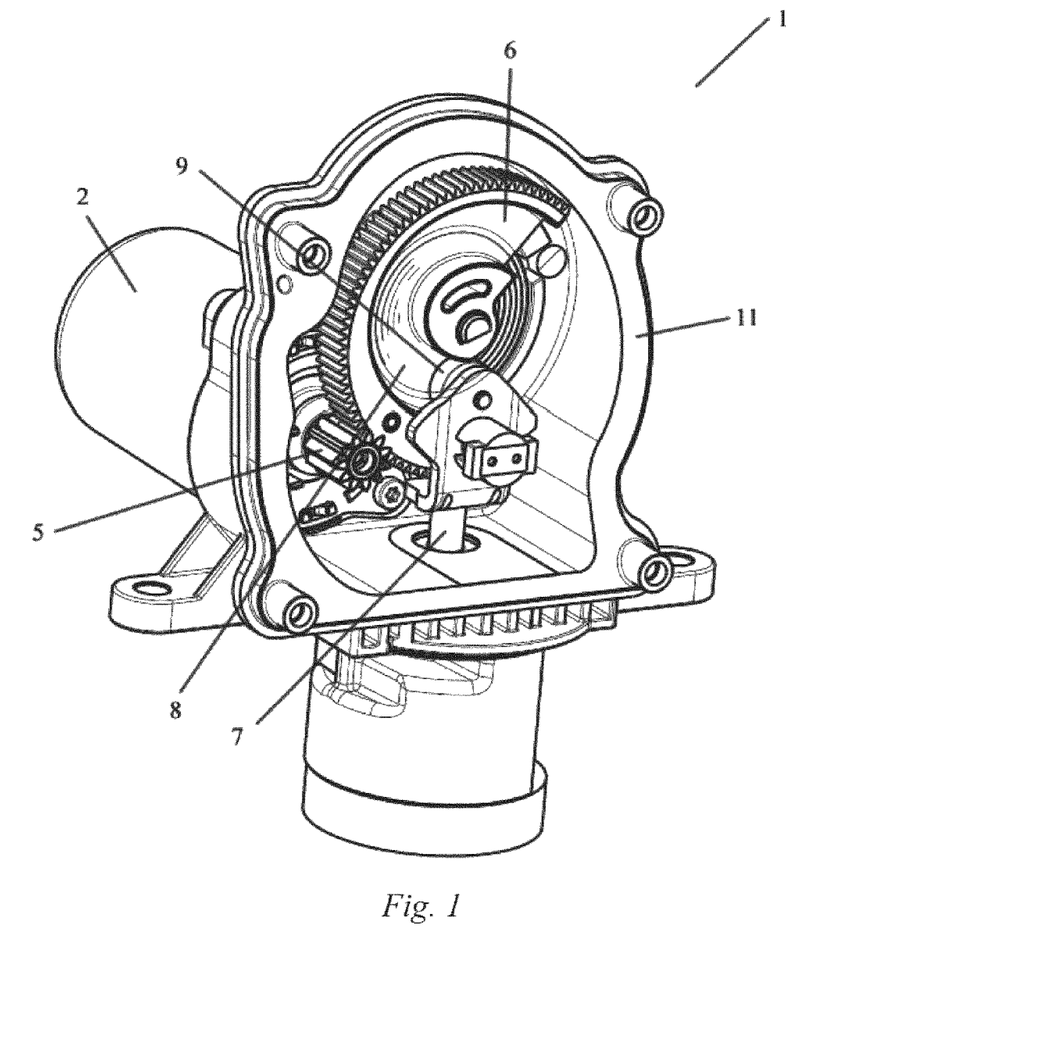
FIG. 1 shows a perspective view of a preferred embodiment of a linear drive device according to the present invention.
Figure 2:
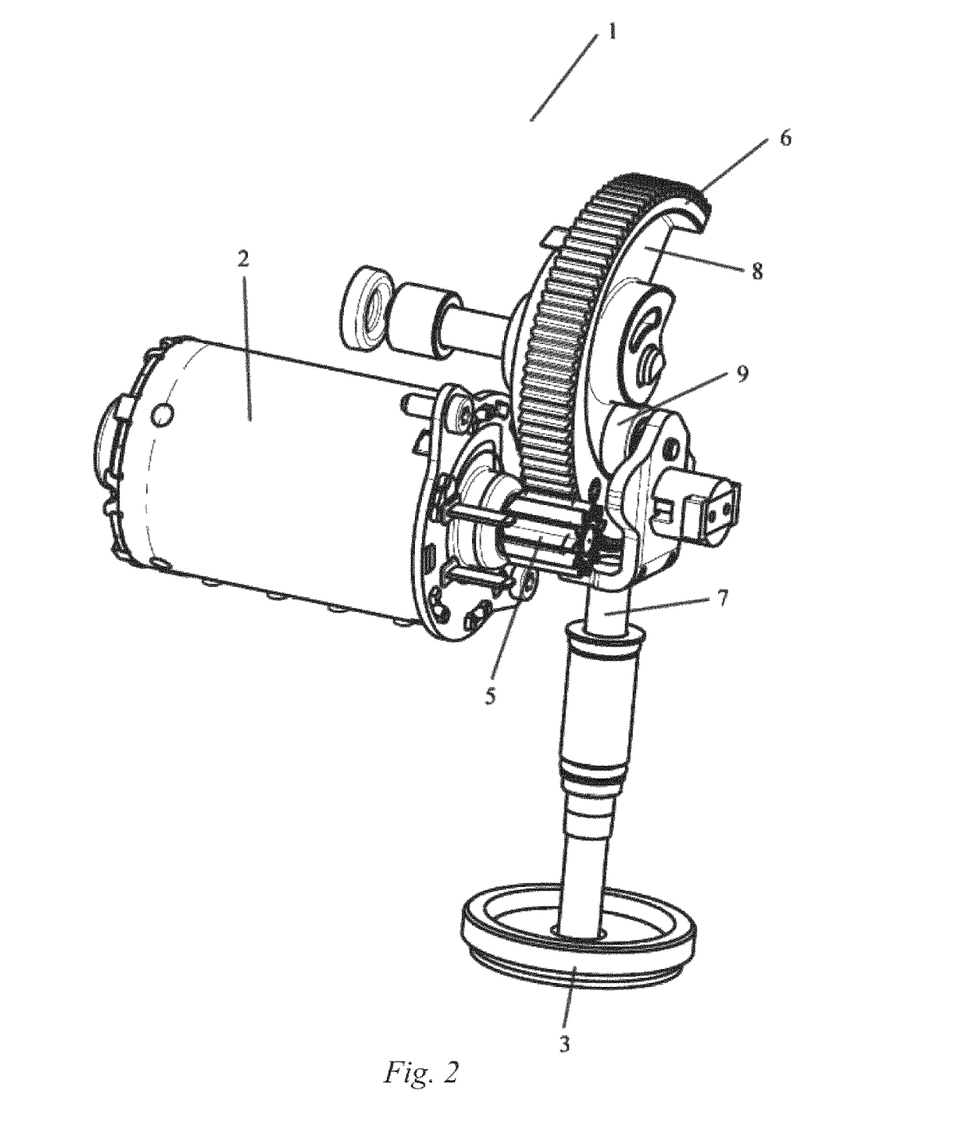
FIG. 2 shows another perspective view of the preferred embodiment of the linear drive device according to the present invention, without showing an external housing.
Figure 3:
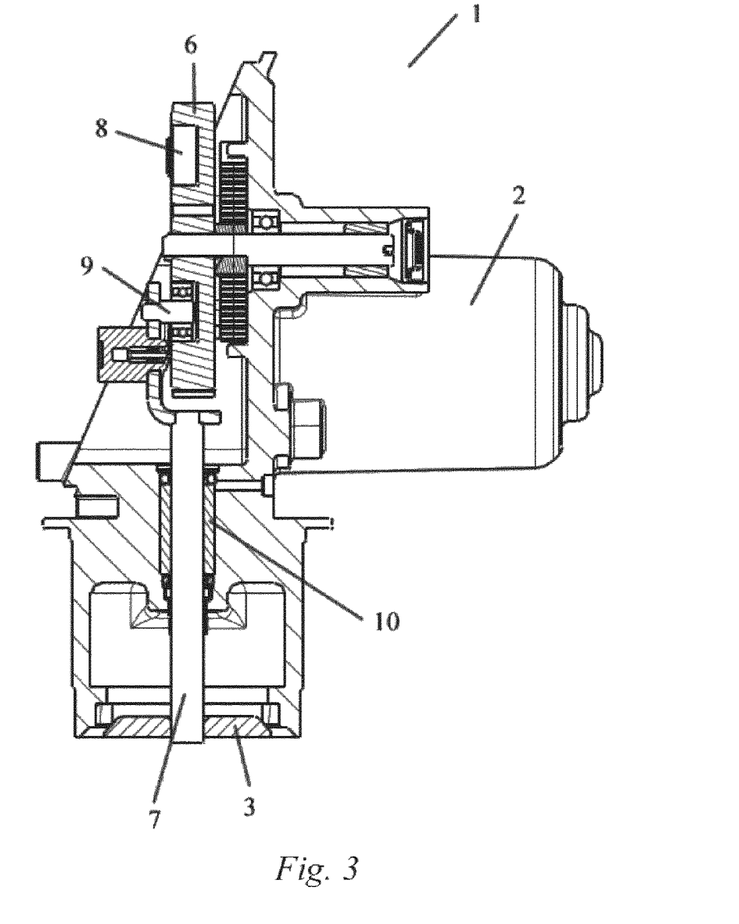
FIG. 3 shows a sectional view of a preferred embodiment of a linear drive device according to the present invention.

A preferred embodiment of a linear drive device according to the present invention is shown in FIGS. 1-3. In the embodiment, the linear drive device 1 comprises a motor 2, a first transmission stage (speed-reducing transmission stage) and a second transmission stage (linear transmission stage). The linear drive device causes a linear movement of an output connecting rod 7 by the driving of the motor 2. In order to prevent dust or other foreign substances from entering and thus damaging the drive device, a housing 11 and a corresponding sealing system are provided.

The first transmission stage, namely the speed-reducing transmission stage comprises a pinion gear 5 fixedly connected to an output shaft of the motor and a transmission gear 6 meshing with the pinion gear 5. When the motor 2 operates, the pinion gear 5 is driven to rotate, so that the transmission gear 6 meshing with the pinion gear 5 is rotated.

The second transmission stage is a linear transmission stage for transforming the rotational movement of the transmission gear 6 into the linear movement of the output connecting rod 7. The second transmission stage comprises a spiral trench 8 formed on the transmission gear 6, a follower 9 received in the trench 8 and the output connecting rod 7 fixedly connected to the follower 9.

Figure 4:
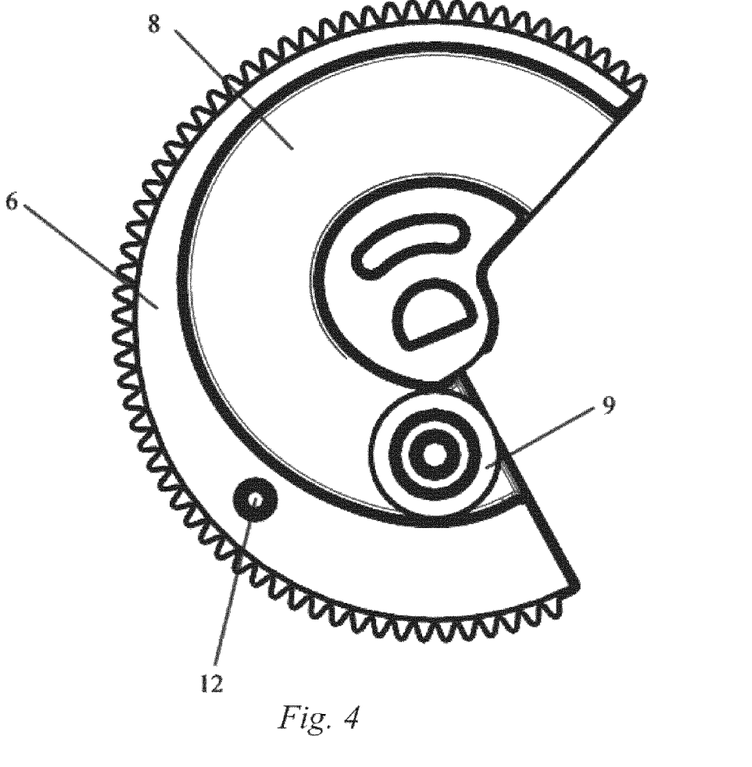
FIG. 4 shows a front view of a transmission gear according to the present invention as well as a follower received in a trench thereof.

The follower 9 may comprise a roller or a rolling bearing or a sliding bearing. Preferably, the follower 9 comprises a ball bearing as shown in FIG. 4. By using the ball bearing, the friction loss is reduced and the efficiency is improved. In the embodiment shown in FIG. 5, the follower 9 comprises a ball bearing and a pin shaft, the ball bearing bears in the trench 8 of the transmission gear 6 and is able to roll along the trench, and one end of the pin shaft is connected to an inner ring of the ball bearing and the other end is supported in a connector 17.

Figure 5:
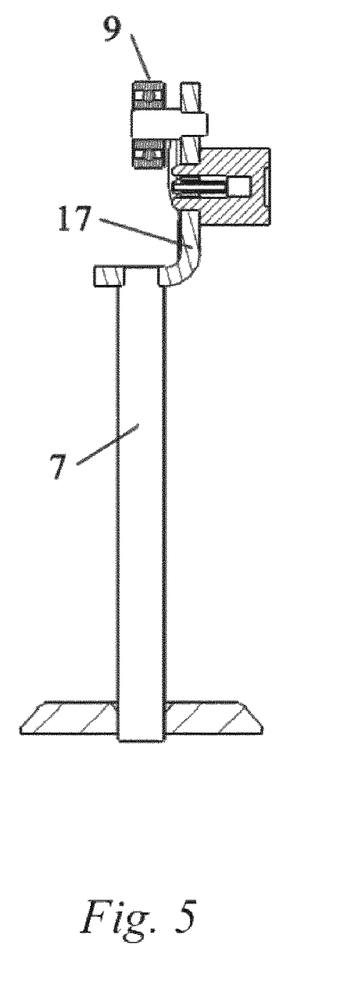
FIG. 5 shows a sectional view of an output assembly comprising an output connecting rod and the follower.

FIG. 5 shows an output assembly comprising the follower 9 and the output connecting rod 7, wherein the output connecting rod 7 is connected to an inner ring of the ball bearing via the connector 17. The output connecting rod 7 is provided in a sleeve member 10, and thus it can only linearly move up and down (see FIG. 3). When the transmission gear 6 rotates, the follower 9 is displaced along the trench 8, due to the spiral shape of the trench 8, the follower 9 is moved up and down, so that the output connecting rod 7 is driven to move up and down.

The transmission gear 6 according to an aspect of the present invention will be described in detail with reference to FIGS. 6 and 7. The transmission gear 6 combines a cam and a gear, and therefore is also referred to as a cam gear.

The transmission gear 6 is constructed as a sector gear. Since an unused portion is eliminated, the material is saved and a light weight is realized. Compared with the use of plastic gears for obtaining a light weight, the strength of the transmission gear 6 according to the present invention is improved, thereby reducing the risk of broken teeth.

Preferably, in a circumferential direction of the transmission gear 6, the length (i.e., the angular range) by which the sectoral face of the transmission gear extends is adapted to the length by which the spiral trench 8 extends. In this case, both end portions of the trench 8 in the circumferential direction of the gear are open. With this structure, the follower 9 can easily slide from the open end portions into the trench 8. The assembling is simple and easy, as compared with the structure in which the follower must be assembled in the cam trench in a direction perpendicular to the plane of the gear because the two ends of the trench are closed.

In another embodiment that is not shown, the length by which the trench 8 extends in the circumferential direction of the gear may be less than the length by which the sectoral face of the transmission gear 6 extends in the circumferential direction of the gear, and only one of the two end portions of the trench 8 in the circumferential direction of the gear is open, while the other may be closed. In this case, the follower 9 may likewise easily slide from the open end portion into the trench 8.

The spiral trench 8 formed on the end face of the transmission gear 6 is used as a cam trench. The spiral trench 8 is for example of an involute shape. The center of the spiral trench 8 coincides with the center of the transmission gear 6. Since the arc length by which the spiral trench 8 rotates in one stroke of the linear transmission stage can be very large, the pressure angle between the trench 8 and the linear transmission stage is reduced. In the case that the transmitted force required has a given component in the direction of the linear movement, the reduction in the pressure angle results in an increase in the cosine value thereof, and thus a reduction in the transmission force between the trench 8 and the linear transmission stage. The spiral trench 8 extends through an angle in the range of 90 degrees to 320 degrees, and more preferably in the range of 180 degrees to 300 degrees, in the circumferential direction of the transmission gear 6.

Figure 6:
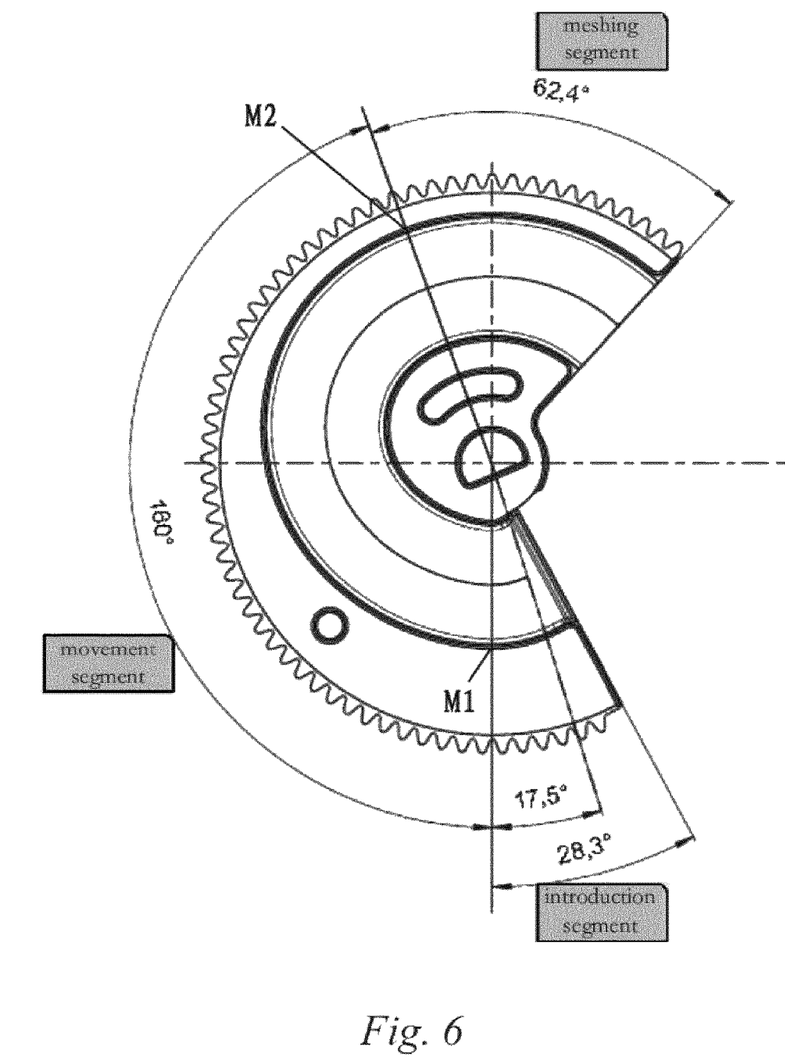
FIG. 6 shows a front view of the transmission gear.

FIG. 6 shows in detail an example of the transmission gear 6 and the cam groove formed on the end face thereof. In the example, the modulus m of the gear is 0.6, and the transmission ratio thereof to the motor gear is 11. However, these parameters are only exemplary, and the present invention is not limited thereto.

As shown in FIG. 6, the trench 8 comprises an introduction segment, a movement segment and a meshing segment. In the illustrated example, the introduction segment, the movement segment and the meshing segment of the cam groove extend through an angle of 28.3 degrees, 160 degrees and 62.4 degrees, respectively, in the circumferential direction of the gear. However, these values are merely exemplary, and the present invention is not limited thereto. For example, the angle by which the movement segment extends in the circumferential direction of the gear can be set within a range of 150 degrees to 300 degrees. The angular ranges of the introduction segment and the meshing segment can also be adjusted appropriately.

The introduction segment is used to introduce the follower 9. An outwardly expanding horn mouth is provided at an opening of the introduction segment, making it easier to introduce the follower 9. The starting position of the movement segment is the position M1, the end position is the position M2, and a linear stroke of the follower 9 is caused in the movement segment. The meshing segment is used to prevent the teeth of the transmission gear 6 from disengaging from the pinion gear 5 when the follower 9 reaches the maximum stroke.

In the example shown in FIG. 6, at a position distanced from the point M1 in the introduce segment by an angle of 17.5 degrees, the curve profile rises by a height larger than 0.3 mm (i.e., the linear stroke caused by the curve rises by 0.3 mm), in order to prevent the follower 9 from falling out of the trench 8. The values for the position and the height are also merely exemplary.

Figure 7:
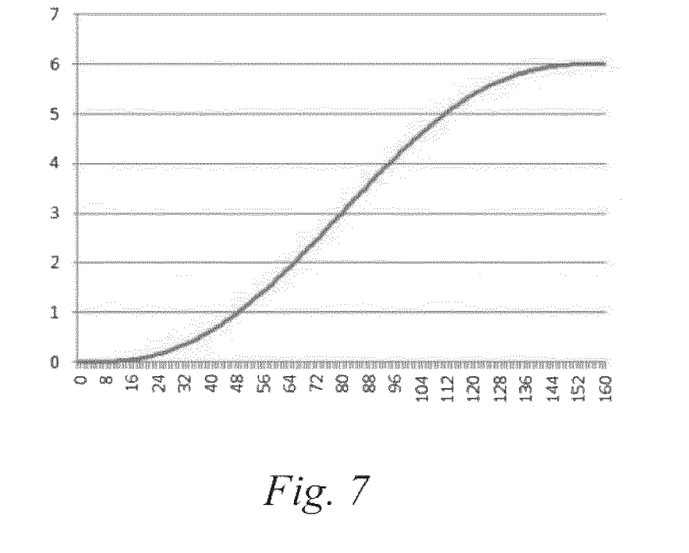
FIG. 7 shows a schematic diagram of a cam curve.

FIG. 7 shows a cam curve corresponding to the movement segment of the cam trench shown in FIG. 6, where the horizontal axis represents the angle by which the transmission gear 6 is rotated, and the vertical axis represents the distance by which the follower 9 moves (i.e. rises) during the rotation of the transmission gear 6. As described above, the movement segment of the cam trench covers a gear angle of 160 degrees. Within this range, the stroke of the follower 9 and the corresponding valve is 6 mm. The value for the stroke is also merely exemplary.

The cam curve shown in FIG. 7 is a fifth-order polynomial curve, and the curve is relatively flat at the starting point and the end point. Thus, the impact force can be reduced at the starting position and the end position, so as to avoid a rigid collision of the follower 9 in the cam trench.

In one aspect, a form-fitting structure exists between the transmission gear 6 and the housing 11 for enclosing the linear drive device. In FIG. 4, a pin 12 is fixed to the transmission gear 6, and the pin, when mating with a feature on the housing 11, can be used as a mechanical stop to prevent the follower 9 from falling out of the trench 8 of the transmission gear 6. For example, when the transmission gear 6 is moved to the position M2, the pin 12 comes into contact with a limiting boss on the housing 11 so as to stop the transmission gear, thereby preventing the follower 9 from dislodging from the trench 8.

A shaft bore having a non-circular cross section is further provided at the center of the transmission gear 6, for example, the shaft bore of a "D"-shaped cross section as shown in FIGS. 4 and 6. The cross section of the shaft bore can be also of another shape such as square. The shaft bore is used for receiving an axle of a restoring system as described below.

Figure 8:
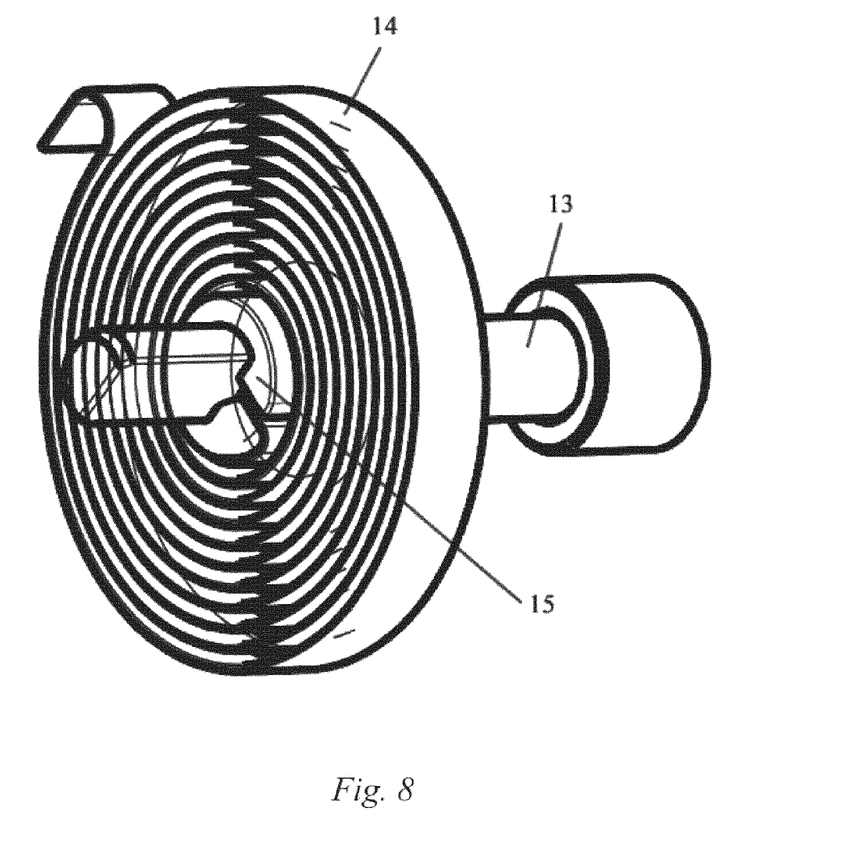
FIG. 8 shows a perspective view of a volute spring together with an axle.
Figure 9:
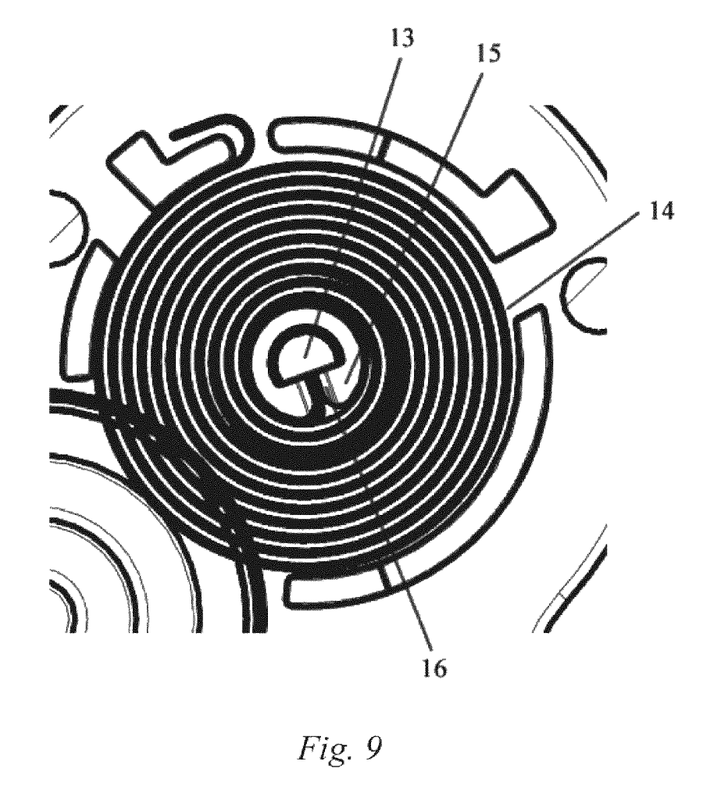
FIG. 9 shows a front view of the volute spring together with the axle.

In order to enable the output connecting rod 7 to return back to the initial position even if the motor 2 malfunctions or is de-energized, the linear transmission device preferably further comprises a restoring system for restoring without electricity as shown in FIGS. 8 and 9. It is well known that when the motor is energized, the driving thereof in two opposite directions can achieve the driving and the restoring. However, when the motor is de-energized (for example, due to a failure or for other reasons), it is desirable that the transmission device can restore to the initial position, so that there is a need for such a restoring system.

The restoring system comprises an axle 13 for bearing the transmission gear 6 and a spring. The spring may be a torsion spring (such as a spiral torsion spring or a torsion bar spring). In addition, the spring may also be the volute spring 14 fixed to the axle 13 as shown in the Figure. The axle 13 is mounted at two end portions thereof to the housing 11 via bearings. The axle 13 and the transmission gear 6 are connected in a relatively non-rotatable manner. One end of the volute spring 14 is fixed to the housing 11 of the device, and the other end is directly or indirectly fixed to the axle 13. After the assembling is completed, in the initial position of the transmission device, the volute spring 14 is in a prestressed state and applies a torque to the axle 13, so that the linear transmission stage trends to move upwards. Since the spring in the initial position is already in a pre-stressed state, when the valve is opened to the largest degree, the prestressing force of the spring is higher. By using the volute spring 14, the restoring force is increased and the fixing is facilitated, with a saving in space.

Fixing the volute spring 14 to the axle 13 may be carried out by using a spring bushing 15. The spring bushing 15 is fixed to the axle 13 in such a way that it surrounds the axle 13 and is provided with a groove 16, and an end portion of the volute spring 14 is received in the groove 16. With this approach, the fixing of the spring is more convenient, and the force is better transferred to the axle 13.

The axle 13 may also be integrally formed with the spring bushing 15, such that the spring is directly connected to the axle 13. Of course, it is also contemplated that the groove 16 for receiving the end portion of the volute spring 14 is directly provided in the axle 13 to realize the function of connection.

Of course, other methods for fixing the spring can also be contemplated, for example, by fixing one end of the spring to the housing and the other end to the transmission gear. In addition, as to the volute spring, the rotation may be along either an inner ring or an outer ring.

The axle 13 at least partially has a non-circular cross section corresponding to the shaft bore of the transmission gear 6, for example a D-shaped cross section, as shown in FIGS. 8 and 9, or may be of another shape, such as square. Torque can be better transmitted between the transmission gear 6 and the axle 13 by using a non-circular cross-section such as a "D"-shape, thereby avoiding the occurence of loosening between the axle and the gear. Accordingly, torque can be reliably transmitted to the volute spring 14, thereby allowing restoring without electricity.

The linear drive device 1 may comprise a sensor (not shown) for detecting a position of the connecting rod, and the sensor may, for example, be an inductive sensor, a Hall sensor, a magnetoresistive sensor or a contact sensor. These sensors can be arranged in different positions, and can detect different types of movements depending on different types of sensors. When the transmission gear 6 moves to the position M1, the sensor senses the position and sends a signal to the motor such that the motor is de-energized and stopped.

The linear drive device 1 can be used in a valve device, in particular an EGR control valve in an engine exhaust gas recirculation system. The engine exhaust gas recirculation system is well known. In such an exhaust gas recirculation system, the EGR control valve is used in an exhaust gas recirculation pipe to control the amount of the recirculated exhaust gas.

For applications in the EGR valve or other valve devices, the output connecting rod 7 of the linear drive device is connected to a valve head 3, and drives the movement of the valve head 3 when the output connecting rod 7 moves, so as to change the distance of the valve head from a valve seat (not shown), thereby realizing an adjustment of the valve. The motor 2 of the linear drive device 1 of the EGR control valve is controlled to drive the valve head 3 to move up and down by the output connecting rod 7 of the linear drive device, so that the valve is closed or opened. During the opening movement of the valve, the follower 9 is in contact with an inner wall of the trench 8, and during the closing movement of the valve, the follower 9 is in contact with an outer wall of the trench 8. When the EGR control valve is de-energized, due to the pre-stressing of the spring, a spring force is applied to axle 13 and causes the axle 13 to rotate, thereby driving the rotation of the transmission gear 6, and the trench 8 on the transmission gear 6 drives the follower 9, thereby driving the connecting rod 7 to move upward until the valve is closed.

In addition, the current position of the output connecting rod 7 is detected by the sensor and is transmitted to a control device so as to control the EGR control valve.

While the present invention has been disclosed in the manner illustrated above by the figures, the present invention is not limited thereto. A variety of changes and modifications made by a person skilled in the art, without departing from the spirit and scope of the present invention, should be included in the scope of protection of the present invention, and thus the scope of protection of the present invention should be defined by the claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SIGNS 1 linear drive device
2 motor
3 valve head
5 pinion gear
6 transmission gear
7 output connecting rod
8 trench
9 follower
10 sleeve member
11 housing
12 pin
13 axle
14 volute spring
15 spring bushing
16 groove
17 connector

The invention claimed is:

1. A linear drive device (1), comprising:
   a motor (2);
   a transmission comprising:
      a speed-reducing transmission stage having a pinion gear (5) fixedly connected to an output shaft of the motor and a transmission gear (6) meshing with the pinion gear (5), and
      a linear transmission stage configured to transform a rotational movement of the transmission gear (6) into a linear movement of a output connecting rod (7), the output connecting rod being received in a sleeve member (10) so as to only move linearly;
   a restoring system configured to restore the position of the transmission to its original position in the event the motor (2) is de-energized, the restoring system comprising an axle (13) attached to the transmission gear (6) and a spring; and
   a follower (9) fixedly connected to the output connecting rod (7),
   wherein the transmission gear (6) comprises a spiral cam trench, having, in a circumferential direction of the transmission gear (6), a first end portion and a second end portion, the spiral cam trench being arranged on an end face of the transmission gear (6) and configured to receive the follower (9) into the spiral cam trench so that as the transmission gear (6) rotates, the follower (9), and output connecting rod (7) fixedly connected thereto, are driven to move up and down, and
   wherein the transmission gear (6) is configured as a sector gear, and at least one of the first and second end portions of the spiral cam trench is open.

2. The linear drive device (1) according to claim 1, wherein the spiral cam trench is configured so as to define an associated cam curve, plotting the angle by which the transmission gear (6) is rotated vs. a distance which the follower (9) moves, is a fifth-order polynomial curve that is substantially flat at a starting point and an end point of the cam curve.

3. The linear drive device (1) according to claim 1, wherein the spiral cam trench extends through an angle within the range of 180 degrees to 320 degrees, in the circumferential direction of the transmission gear (6).

4. The linear drive device (1) according to claim 1, the spiral cam trench comprising:
   an introduction segment,
   a movement segment, and
   a meshing segment,
   wherein the introduction segment is configured to introduce the follower (9), the movement segment is configured to cause a linear stroke of the follower (9), and the meshing segment is configured to prevent the transmission gear (6) from disengaging from the pinion gear (5) when the follower (9) reaches an end point of the linear stroke.

5. The linear drive device (1) according to claim 4, wherein the introduction segment has an opening, and an outwardly expanding horn mouth is provided at the opening of the introduction segment.

6. The linear drive device (1) according to claim 4, wherein at least part of a curve profile of the introduction segment rises by a predetermined amount.

7. The linear drive device (1) according to claim 4, wherein the movement segment extends through an angle within the range of 150 degrees to 300 degrees in the circumferential direction of the transmission gear (6).

8. The linear drive device (1) according to claim 1, wherein a shaft bore having a non-circular cross section is provided at the center of the transmission gear (6).

9. The linear drive device (1) according to claim 8, wherein the non-circular cross section of the shaft bore is "D"-shaped.

10. The linear drive device (1) according to claim 1, wherein a limiting pin is further provided on the transmission gear (6), the pin cooperating with a structure on a housing of the linear drive device to serve as a mechanical stop.

11. The linear drive device (1) according to claim 1, wherein a length by which a sectoral face of the transmission gear (6) extends in the circumferential direction of the transmission gear (6) is adapted to correspond to a length by which the spiral cam trench extends in the circumferential direction of the transmission gear (6).

12. The linear drive device (1) according to claim 11, wherein both the first and second end portions of the spiral cam trench are open.

\* \* \* \* \*